July 6, 1965   K. SCHWARTZWALDER   3,192,836
DIAPHRAGM FOR FUEL PUMPS AND THE LIKE
Filed Sept. 19, 1962

INVENTOR.
Karl Schwartzwalder
BY
Paul J. Reising
ATTORNEY

3,192,836
DIAPHRAGM FOR FUEL PUMPS AND THE LIKE

Karl Schwartzwalder, Holly, Mich., assignor to General Motors Corporation, Detroit, Mich., a corporation of Delaware
Filed Sept. 19, 1962, Ser. No. 224,757
6 Claims. (Cl. 92—103)

This invention relates to diaphragm-operated pumps, valves, gauges and the like and, more particularly, to an improved diaphragm therefor. It has as its principal object the provision of a fluid impervious diaphragm which has improved flexibility over a wide temperature range along with excellent strength and wear resistance and a marked ability to form a good fluid-tight seal with its supporting structure.

Briefly, these objects are accomplished in accordance with the invention by a diaphragm which comprises a layer of soft flexible foamed elastomer covered on each side with a thin layer of flexible, nonporous liquid-impervious elastomer. Preferably, the diaphragm also includes a strengthening layer of cloth within and covered on both sides by the foamed elastomer. Where the diaphragm is to be used in fuel pumps or in other devices where the diaphragm will be exposed to gasoline or other liquid hydrocarbon, the preferred elastomer for the foam and for the nonporous layers is butadiene-acrylonitrile copolymer, commonly referred to as Buna N. However, other types of synthetic elastomers or natural rubber may be used if desired, the choice of elastomer depending, of course, on the nature of the liquid to which the diaphragm will be exposed.

Figure 1:
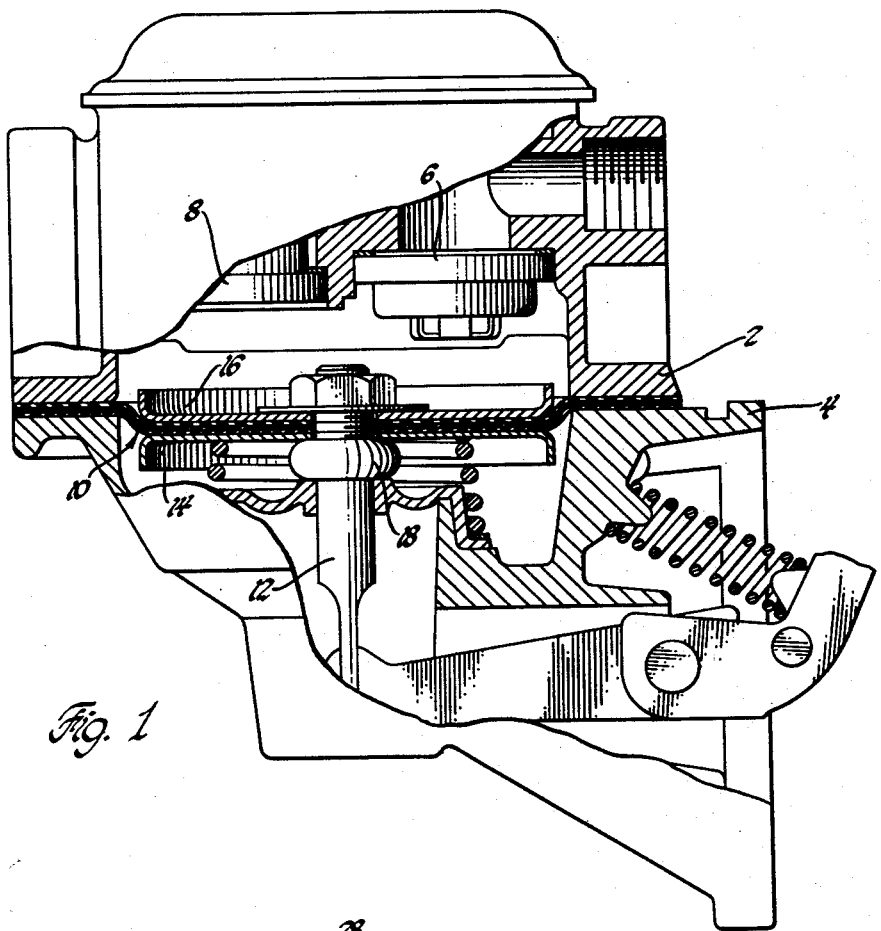
Figure 2:
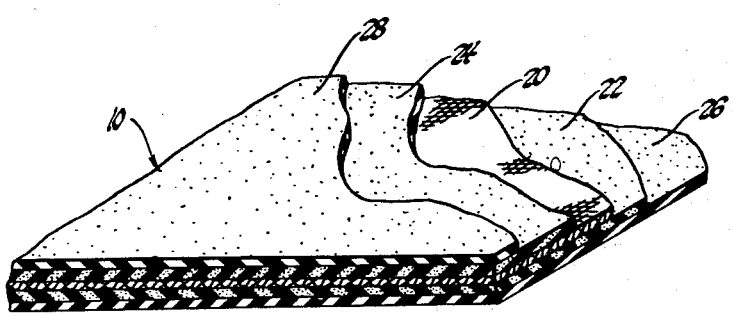

The above and other objects and features of the invention will appear more clearly from the following detailed description of a preferred embodiment thereof made with reference to the drawings in which:

FIGURE 1 is a side view with parts broken away of a fuel pump embodying the invention; and FIGURE 2 is an enlarged perspective view in section and with parts broken away of the fuel pump diaphragm shown in FIGURE 1.

Referring now to the drawings, there is shown in FIGURE 1 an automobile fuel pump having a conventional metal casing and operating mechanism, the casing being formed of upper and lower sections 2 and 4 with the upper section constituting the pumping chamber and having inlet and outlet valves 6 and 8 of well-known construction. The bottom wall of the pumping chamber is formed by flexible diaphragm 10 the periphery of which is pressed between casing sections 2 and 4 to form a liquid seal. A lever operated push rod 12 supported by the lower casing section is secured to the center of the diaphragm to impart up-and-down flexing motion and thereby cause the pumping action. For securement of this push rod to the diaphragm the threaded upper end of the rod extends through the diaphragm and through a pair of round metal plates 14 and 16, one on each side of the diaphragm, and has a nut threaded thereon whereby the center of the diaphragm is pressed between the nut and flange 18 to provide a liquid-tight seal.

The structure of diaphragm 10 is best shown in FIGURE 2. In accordance with the invention it consists of a cloth layer 20, preferably woven of long staple Egyptian cotton, sandwiched between and bonded to layers 22 and 24 of closed cell foamed or sponge Buna N elastomer, each of the foamed layers having its outer surface covered by and bonded to a relatively thin liquid impervious layer of Buna N elastomer as shown at 26 and 28. To manufacture the diaphragm laminate material shown, Buna N foam stock was calendered onto both sides of light cotton duck cloth and the coated cloth was cured by placing between heated plates for about 30 minutes at 320° F., the only pressure being that from the weight of the upper plate. After curing the rubber had foamed leaving liquid impervious layers 26 and 28. After the diaphragm material was so prepared in sheet form, the individual diaphragms were punched from it by conventional cutting operations. The particular foam stock used was as follows:

| Ingredient: | Parts by weight |
|---|---|
| Butadiene acrylonitrile (26% acrylonitrile) | 100 |
| Zinc oxide | 5 |
| Sulfur | .4 |
| Agerite Hipar antioxidant (mixture of phenyl beta naphthylamine and NN' diphenyl-p-phenylene-diamine) | 3 |
| Semi-reinforcing carbon black | 50 |
| Stearic acid | 8 |
| $NaHCO_3$ solution (50% in dibutoxy ethoxy ethyl adipate plasticizer) | 20 |
| Dibutoxy ethoxy ethyl adipate plasticizer | 15 |
| Tetramethylthiuram monosulfied accelerator | 2 |

By reason of the intermediate foam layers, the diaphragm provides an excellent combination of physical properties not obtainable with an ordinary nonporous type elastomer diaphragm. Chief among the improved qualities attained are low temperature flexibility and excellent sealing, these improvements being accomplished without any sacrifice in strength or wear resistance.

While the invention has been described in detail specifically with reference to a preferred embodiment thereof, it should be understood that various modifications may be used, all within the full and intended scope of the claims which follow.

I claim:
1. A pump diaphragm comprising a relatively thick continuous layer of cloth reinforced foamed butadiene acrylonitrile elastomer having bonded on each side thereof and co-extensively therewith a thin layer of nonporous fluid impervious butadiene acrylonitrile elastomer.

2. A pump diaphragm comprising a continuous layer of a foamed elastomer having bonded to each side thereof and extending co-extensively therewith a layer of a nonporous fluid impervious elastomer.

3. A pump diaphragm as set forth in claim 2 wherein said foamed layer comprises an intermediate continuous layer of cloth having a continuous layer of foamed elastomer bonded to each side thereof.

4. A pump diaphragm as set forth in claim 2 wherein the non-porous, fluid impervious, elastomer layers are butadiene-acrylonitrile copolymer.

5. In a pump device comprising a casing having a fluid chamber therein, one wall of said chamber comprising a flexible diaphragm having its periphery pressed against said casing in sealing relationship therewith, the improvement which comprises said diaphragm having a continuous foam elastomer layer and a non-porous fluid impervious elastomer layer bonded on each side of said foam layer coextensively therewith.

6. In a pump device comprising a casing having a fluid chamber therein, one wall of said chamber comprising a flexible diaphragm having its periphery pressed against said casing in sealed relationship therewith, the improvement which consists of said diaphragm having a cloth reinforced continuous foamed elastomer layer and a co-extensive non-porous, fluid impervious elastomer layer covering and bonded to each side of said foamed layer.

(References on following page)

References Cited by the Examiner

UNITED STATES PATENTS

| | | | |
|---|---|---|---|
| 1,515,702 | 11/24 | Reybold | 154—52 |
| 2,348,740 | 5/44 | Jennings | 156—249 |
| 2,537,241 | 1/51 | Smith | 103—150 |
| 2,578,140 | 12/51 | Krupp | 156—77 |
| 2,586,275 | 2/52 | Toulmin | 156—78 |
| 2,644,280 | 7/53 | O'Neil | 161—161 X |
| 2,734,009 | 2/56 | Coffey | 154—50 |
| 2,999,041 | 9/61 | Lappala | 161—61 X |
| 3,041,220 | 6/62 | Martin et al. | 161—161 |

RICHARD B. WILKINSON, *Primary Examiner.*

EMILE PAUL, FRED E. ENGELTHALER, *Examiners.*